United States Patent
Klocek et al.

Patent Number: 6,083,583
Date of Patent: Jul. 4, 2000

[54] HIGH STRENGTH, HIGH MODULUS CONTINUOUS POLYMERIC MATERIAL FOR IMPACT RESISTANT APPLICATIONS

[75] Inventors: Paul Klocek, Dallas, Tex.; William J. MacKnight, Amherst; Richard J. Farris, Leeds, both of Mass.; Christian Lietzau, Rhinebeck, N.Y.

[73] Assignees: Raytheon Company, Lexington; University of Massachusetts, Amherst, both of Mass.

[21] Appl. No.: 09/174,303

[22] Filed: Oct. 15, 1998

Related U.S. Application Data

[60] Division of application No. 08/521,154, Aug. 29, 1995, Pat. No. 5,935,651, which is a continuation-in-part of application No. 08/241,218, May 11, 1994, Pat. No. 5,573,824.

[51] Int. Cl.[7] .................................................. B32B 27/36
[52] U.S. Cl. ........................... 428/35; 428/113; 428/114; 428/142; 428/252; 428/257; 428/255; 428/260; 428/265; 428/911; 428/918
[58] Field of Search .............................. 428/38, 113, 114, 428/142, 252, 257, 258, 260, 265, 911, 918

[56] References Cited

U.S. PATENT DOCUMENTS

| | | |
|---|---|---|
| 4,748,064 | 5/1988 | Harpell et al. . |
| 5,324,586 | 6/1994 | Klocek et al. . |
| 5,573,824 | 11/1996 | Klocek et al. . |
| 5,629,074 | 5/1997 | Klocek et al. . |

Primary Examiner—Richard Weisberger
Attorney, Agent, or Firm—Baker Botts L.L.P.

[57] ABSTRACT

A protective, impact resistant material and method, the material comprising a fabric of thermoplastic polymeric fibers having a strength of at least 0.4 GPa and an elastic modulus of at least 5 GPa and a matrix of polymeric material disposed in the interstices between the fibers, the matrix having an elastic modulus in the range 0.2 to $3 \times 10^6$ psi. The polymeric fibers can be gel spun polyethylene, polypropylene, nylon, polyvinyl alcohol and polyethylene terephthalate. In a second embodiment, the matrix is derived from the fabric. The method of making the material comprises providing a matrix of melted polymeric material transparent to energy of a predetermined type and having a predetermined melting temperature, placing a fabric of polymeric fibers having a melting temperature higher than the melting temperature of the matrix in the matrix, applying a pressure of 1000 to 6000 psi to the fabric disposed in the matrix, then raising the temperature to the melting temperature of the fabric for the minimum time required to cause consolidation of the fabric and the matrix and rapidly cooling the consolidated fabric and matrix to a temperature below the melting temperature of the fabric. In accordance with a second embodiment there is provided a fabric of polymeric fibers as in the first embodiment which is operated upon as in the first embodiment to cause melting of a sufficient portion of the fabric to fill the interstices between the fibers of the fabric and the fabric is then rapidly cooled to a temperature below the melting temperature of the fabric.

12 Claims, 1 Drawing Sheet

HIGH STRENGTH, HIGH MODULUS CONTINUOUS POLYMERIC MATERIAL FOR IMPACT RESISTANT APPLICATIONS

This application is a division of U.S. Ser. No. 08/521,154 filed Aug. 29, 1995, now U.S. Pat. No. 5,935,651, which is a continuation-in-part of U.S. Ser. No. 08/241,218 filed May 11, 1994 (now U.S. Pat. No. 5,573,824 issued Nov. 12, 1996).

CROSS REFERENCE TO RELATED APPLICATIONS

This application is related to Ser. No. 07/939,256, filed Sep. 2, 1992, now U.S. Pat. No. 5,324,586, of Paul Klocek et al., the contents of which are incorporated herein by reference. This application is a continuation-in-part of Ser. No. 08/241,218, filed May 11, 1994, now U.S. Pat. No. 5,573,824, the contents of which are incorporated herein by reference.

BACKGROUND OF THE INVENTION

1. Field of the Invention

This invention relates generally to a tough, durable and impact resistant continuous polymer coating. The polymer coating in accordance with this invention has very high strength and stiffness in a direction along the coating surface while being compliant in a direction normal to the coating surface. This permits the polymer to be very impact resistant and relates it to applications where high strength and/or impact resistance is desired in a moldable material. Since the polymer in accordance with the invention is continuous, it also relates to applications requiring high strength and/or impact resistance while being impermeable or transparent. More specifically, this invention relates to, but is not limited to, optical coatings for windows and domes (a window being defined herein as something between a system and the environment to protect the system from the environment) and particularly, but not limited to, coatings for infrared windows and domes, primarily, but not limited to, use on aircraft, and, more specifically, to a polymer or plastic optical coating to protect infrared optics, particularly infrared windows and domes.

2. Brief Description of the Pior Art

To increase the survivability and operational capability of infrared windows and domes, particularly as used during flight and particularly for the 8 to 12 micrometer wavelength (infrared) region, protective coatings are required for rain, dust, sand and hail impact. The impact of these particles during flight (aircraft, missile, helicopter, etc.) on the window or dome erodes the window or dome, thereby reducing its strength and ability to transmit infrared or other energy radiations therethrough. This degradation can render the electro-optical sensor behind the dome or window inoperable or even damaged should the window or dome catastrophically fail.

Presently used prior art infrared windows and domes degrade in performance due to loss of transmission and strength due to environmental degradation, particularly due to erosion by rain, dust and sand particles at aerodynamic speeds.

Prior art solutions to this problem have involved the use of a protective coating on the infrared domes and windows. Due to the requirement that the protective coating be transparent in the wavelength region in which the window or dome operates (i.e., 8 to 12 micrometers, 3 to 12 micrometer, 3 to 5 micrometers, 1 to 12 micrometer, etc.), past and current efforts on protective coatings have concentrated on traditional inorganic materials, such as silicon, gallium phosphide, boron phosphide, diamond, germanium carbide, silicon nitride, silicon carbide, oxides, etc. to obtain the desired transparency. These coating have displayed high strength, high fracture toughness, high hardness and moderate to high elastic (Young's) modulus.

The general mechanical requirements of coatings for soft (rain) and hard (sand, hail, dust, etc.) particle impact protection of substrates are low hardness and high fracture toughness or strength with a high elastic modulus to reduce the strain induced in the substrate or a low elastic modulus to absorb the impact stress. Accordingly, the above-mentioned materials have shown only limited effectiveness in solving the problem of erosion due to particle impact and have been difficult to scale up in size. It is therefore apparent that other solutions to the problem were required which overcome or minimize those problems.

The above described problems were reduced by providing polymeric coatings for infrared windows and domes which were infrared transparent polymers with low hardness and high strength as set forth in the above-mentioned application. These polymers absorb and distribute the stresses of the impacting particles, thereby protecting the underlying infrared optics, primarily infrared windows and domes and primarily, but not limited to, the 8 to 12 micrometer wavelength range.

The polymeric infrared transmitting coating described in the above mentioned application has been found to be very effective in providing the required protection for infrared windows and domes against particles which do not set up stress waves in the plane of the window or dome surface. Such materials are inexpensive and readily available in films which can be placed on the exterior surface of an infrared window or dome. Polymers had been overlooked prior to the above noted application for use as infrared optical protective coatings, apparently due to their well-known absorption bands throughout the infrared range. These bands are the intrinsic molecular vibrational absorption due to the constituents of the polymer (i.e., C—H stretching, bending modes). However, on detailed analysis of the infrared spectra of various polymers, some are highly transparent in, for example, the 8 to 12 micrometer region, where considerable interest and applications exist for electro-optical systems. These same 8 to 12 micron transparent polymers and copolymers, such as, for example, and not limited to, polyethylene, ethylene-octene copolymer, polyvinylpyrrolidene, poly(acenaphthylene), styrene/ethylene-butylene copolymer, poly(1-butene), poly(acrylic acid, ammonium salt), polyamide resin, ethylene/propylene copolymer and ethylene/propylene/diene terpolymer, possess low hardness, high strength and low elastic (Young's) modulus, making them candidates as particle impact and erosion resistant coatings for infrared windows and domes.

The polymers of choice in the above noted applications are those that provide infrared transmissivity in the desired wavelength range, such as, for example, 8 to 12 micrometers, low hardness less than about 50 kg/mm$^2$, high strength in the range of 10,000 to 100,000 psi with a preferred value of greater than 20,000 psi and low elastic (Young's) modulus in the range of 0.2 to 3×10$^6$ psi and preferably less than 0.5×10$^6$ psi. Most polymers do not display transmissivity in the infrared range and it has been generally believed that polymers in general do not display such transmissivity and are absorbent to infrared energy. In those cases where the polymers provide the desired optical properties but fail to provide the desired mechanical properties, copolymers of the optically desirable polymers and other polymers which provide the desired mechanical properties can be formulated to provide a compromise which still presents the critical properties in the desired ranges. The ethylene-octene copolymer is an example of such copolymer. Additional copolymers or terpolymers are desirable to optimize the optical transparency and the mechanical and thermal properties, particularly strength and thermal stability. Candidates include polyethylene, ethylene-octene copolymer, polyvinylpyrrolidene, poly(acenaphthylene), styrene/ethylene-butylene copolymer, poly(1-butene), poly (acrylic acid, ammonium salt), polyamide resin, ethylene/propylene copolymer and ethylene/propylene/diene terpolymer, which are infrared (8 to 12 micrometers) transparent and neoprene, polyurethane, fluorelastomer, polycarbonate, polyether sulfone, polyether ether-ketone and polyacrylate which are very rain erosion resistant. Also, the copolymers can be tailored to provide vibrational modes of the atoms therein at frequencies outside of the optical frequency range of interest to possibly provide the desired transmissivity in the frequency range of interest.

The sheet of polymeric material is placed on the optical window or dome in any of many well known ways, such as, for example, by static or chemical bond with or without an intermediate "glue" layer, as required, spinning on, spraying on or cast on and allowed to set.

A problem with the above described polymeric sheet material is that it is compliant in both the plane normal thereto as well as in the plane thereof. Accordingly, though hard particles, such as sand, cause stress waves to propagate essentially only along the line of impact of the window therewith, which is normal to the plane of the polymeric material, rain additionally causes stress waves to propagate along the surface of the window in a direction essentially along the plane of the window and the polymeric covering thereon. These stress waves in the plane of the polymeric material cause a polymer coating of the type discussed with reference to the above noted copending application to move along the path of the stress waves or in the plane of the polymeric coating. Since the window or dome to which the coating is attached does not undergo such movement, there is a tendency for the polymer coating to separate or delaminate from the dome or window and eventually tear and thereafter possibly further be removed from the window. This causes a loss of the window or dome protection previously obtained from the coating.

SUMMARY OF THE INVENTION

In accordance with the present invention, the above described problem of the prior art is minimized. This is accomplished by providing a high strength (from about 10,000 to about 100,00 psi and preferably greater than 20,000 psi), high elastic modulus (from about 5 to about 100 GPa and preferably about 50 GPa), solid and continuous polymeric material in the form of a fabric of overlapping and underlapping sinusoidal woven fibers designed or derived from high molecular weight polymer and consolidated to maintain the crystalline weave with a high degree of controlled orientation. The polymeric fibers are preferably, but not limited to, polyethylene which is woven and consolidated whereby the orientation and weave is retained in the crystallites and/or molecules. This is preferably accomplished by use of just the woven fiber but can also involve disposing the woven polymeric fabric in a matrix, the matrix being preferably of a polymeric material suitable for use as required in the above noted copending application. The woven fiber or the woven fiber and matrix are consolidated in some manner, such as by hot pressing, calendaring, tentering, etc. The woven fiber fabric is heated under a pressure of about 1000 psi or more and preferably from about 4000 to about 6000 psi to a temperature at or slightly above its melting point for the minimum period of time required to cause consolidation of the woven fibers and/or the woven fibers and matrix, this taking generally less than about 60 minutes. The consolidated fibers and matrix are then cooled rapidly, generally in 5 minutes or less, to below 100° C. The rapid cooling is to maintain the orientation of the long molecule chains (high molecular weight) intact to the greatest extent possible concomitant with the fiber and/or fiber/matrix consolidation. The result is a coating which is strong in the plane of the coating, yet compliant and elastically deformable in a direction normal to that plane so that the coating is able to absorb and store any impact stress thereto.

Any polymeric material with high (about 0.4 GPa or 50,000 psi) strength and high (~5 GPa or greater or $0.7 \times 10^6$ psi or greater) elastic modulus which is a thermoplastic that can be processed as required above can be used. Examples of materials which can be so used are, but are not limited to, gel spun high molecular weight polyethylene, polypropylene, nylon, polyvinyl alcohol and polyethylene terephthalate. A polyethylene fabric composed of "Spectra" fibers and having a molecular weight of approximately 1,000,000 has been found to be extremely suitable for use in accordance with the present invention. Suitable polymers are generally linear polymer chains and generally have molecular weights on the order of about one million or more.

The woven fabric need not be transparent in the range of interest though the matrix, if used, must be transparent in that range. When the fabric is not transparent in the range of interest, the fibers thereof must be sufficiently spaced apart to permit an adequate amount of the radiation of interest to pass between the fibers and the matrix, if any, disposed between the fibers.

In a further embodiment of the invention, the matrix can be omitted and the polymeric fiber fabric itself can be heated under pressure and temperature conditions the same as above described for use in conjunction with the fabric and matrix to flatten the fabric and cause the material forming the fibers to flow into the interstices between the fibers. This results in a continuous sheet of the fibrous material with the interstices filled with the same material as the fibers since the interstices are now filled with polymeric material which has flowed from the fibers.

In practice, the above described fibrous material is secured over a window or radome in place of the prior art coatings in well known manner to provide protection.

DESCRIPTION OF THE PREFERRED EMBODIMENT

Figure 1:
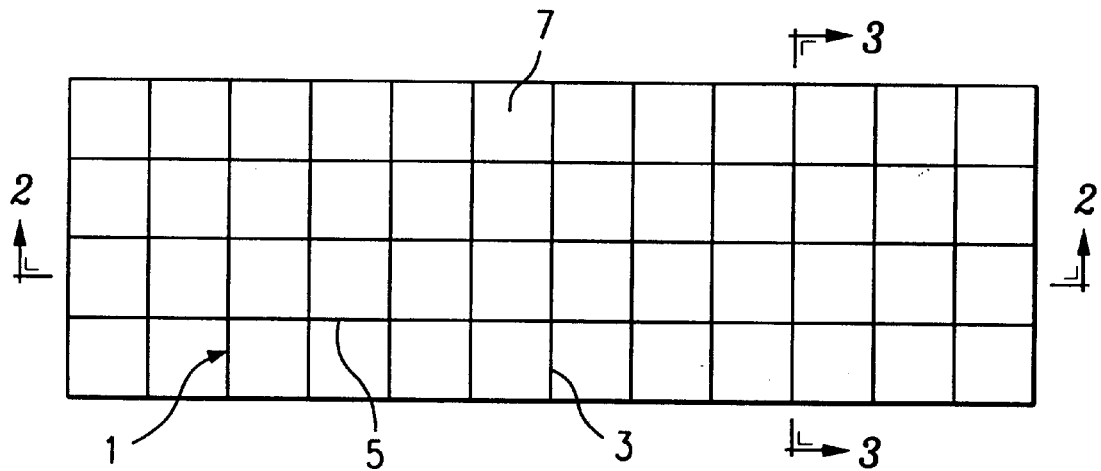
FIG. 1 is a top view of a fabric disposed in a matrix in accordance with the present invention.
Figure 2:
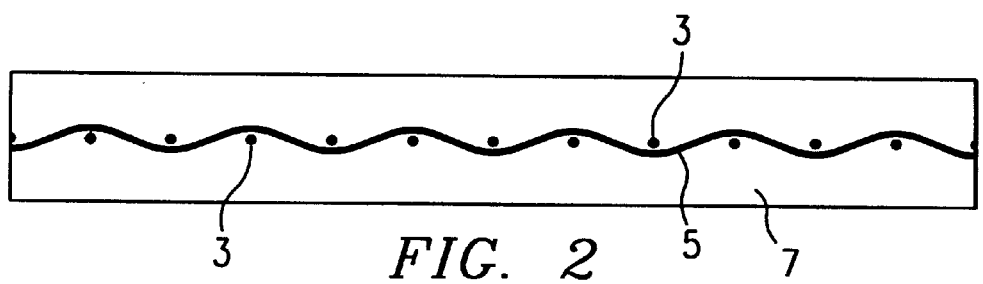
FIG. 2 is a cross section taken along the line 2—2 of FIG. 1.
Figure 3:
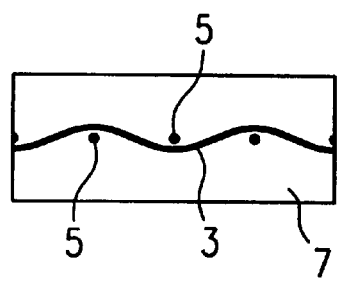
FIG. 3 is a cross section taken along the line 3—3 of FIG. 1.

Referring first to FIGS. 1 to 3, there is shown a first embodiment of a coating material in accordance with the present invention. In accordance with this embodiment, there is provided a fabric 1 of very high molecular weight polyethylene fibers having a molecular weight of approximately 1,000,000, the particular fabric used being composed of "Spectra" fibers. The fabric 1 is composed of a plurality of sinusoidally shaped fibers in two groups 3 and 5, each of the groups disposed orthogonally to the other with the fibers of each group overlapping and underlapping the fibers of the other group as shown in FIGS. 2 and 3. The fabric 1 may or may not be placed between two sheets of a matrix 7 of a polymer having a melting temperature lower than that of the fabric. The fabric fiber can also be drawn with a matrix polymer coating or cladding thereon or the fabric can be immersed or sprayed with a liquid polymer (i.e. melted, dissolved, etc.). If a matrix is used, the infrared transmitting polymers mentioned above, i.e., polyethylene, etc. are preferred. The fabric or the fabric with the matrix are placed under pressure of 4000 psi in, for example, a hot press with a hydraulic ram and the temperature is raised to between 140° C. and 190° C., this temperature being at or slightly above the melting temperature of the fabric which, in this case, is 140° C., for 60 minutes or less to permit the fibers to melt sufficiently to permit the fabric or the fabric and matrix to consolidate without material breakup of the long molecular chains comprising the fabric fibers. The consolidated polymer is then rapidly cooled to less than 100° C. in 5 minutes or less. The final material can now be used to coat optical devices in standard manner or as an impact resistant coating for other non-optical applications or as a free-standing polymer for structural, optical or other applications.

In accordance with a second embodiment of the invention, the fabric 1 of FIG. 1 is used without the matrix. The fabric 1 is heated to a temperature between 140° C. and 150° C. under the same pressure conditions as in the first embodiment for about 60 minutes or less until the fibers have melted and flowed sufficiently so that the fiber material also fills the interstices between the fibers and forms a continuous material. The continuous material is then rapidly cooled as above to provide the final material required for coating an optical device.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

What is claimed is:

1. A protective coating material which comprises:
   (a) a fabric of polymeric fibers;
   (b) a matrix of polymeric material disposed in the interstices between said fibers and having a lower melting temperature than said polymeric fibers; and
   (c) said coating material having a higher strength and stiffness in a direction along the surface of said coating than in a direction normal to the surface of said coating.

2. The material of claim 1 wherein said fibers are thermoplastic and have a strength of at least about 0.4 GPa (50,000 psi) and an elastic (Young's) modulus of at least about 5 GPa ($0.7 \times 10^6$ psi) and said matrix has an elastic modulus in the range from about 0.2 to about $3 \times 10^6$ psi.

3. The material of claim 1 where said fabric is composed of a first group of spaced apart fibers extending in a first direction and sinusoidally shaped and a second group of spaced apart fibers extending in a direction essentially normal to said first direction and sinusoidally shaped, said fibers of said second group alternately overlying and underlying fibers of said first group.

4. The material of claim 2 where said fabric is composed of a first group of spaced apart fibers extending in a first direction and sinusoidally shaped and a second group of spaced apart fibers extending in a direction essentially normal to said first direction and sinusoidally shaped, said fibers of said second group alternately overlying and underlying fibers of said first group.

5. The material of claim 2 wherein said polymeric fibers are taken from the group consisting of gel spun polyethylene, polypropylene, nylon, polyvinyl alcohol and polyethylene terephthalate.

6. The material of claim 4 wherein said polymeric fibers are taken from the group consisting of gel spun polyethylene, polypropylene, nylon, polyvinyl alcohol and polyethylene terephthalate.

7. The material of claim 5 wherein said matrix is taken from the group consisting of polyethylene, ethylene-octene copolymer, polyvinylpyrrolidene, poly(acenaphthylene), styrene/ethylene-butylene copolymer, poly(1-butene), poly (acrylic acid, ammonium salt), polyamide resin, ethylene/propylene copolymer, ethylene/propylene/diene terpolymer, neoprene, polyurethane, fluorelastomer, polycarbonate, polyether sulfone, polyether ether-ketone, and polyacrylate.

8. The material of claim 6 wherein said matrix is taken from the group consisting of polyethylene, ethylene-octene copolymer, polyvinylpyrrolidene, poly(acenaphthylene), styrene/ethylene-butylene copolymer, poly(1-butene), poly (acrylic acid, ammonium salt), polyamide resin, ethylene/propylene copolymer, ethylene/propylene/diene terpolymer, neoprene, polyurethane, fluorelastomer, polycarbonate, polyether sulfone, polyether ether-ketone, and polyacrylate.

9. The material of claim 2 wherein said matrix is infrared transmissive.

10. The material of claim 9 wherein said fabric is infrared transmissive.

11. The material of claim 1 wherein said matrix is derived from and is of the same material as said fabric.

12. The material of claim 2 wherein said matrix is derived from and is of the same material as said fabric.

* * * * *

UNITED STATES PATENT AND TRADEMARK OFFICE
CERTIFICATE OF CORRECTION

Patent No.: 6,083,583
Dated: July 4, 2000
Inventor(s): Paul Klocek, William J. MacKnight, Richard J. Farris, Christian Lietzauf It is certified that error appears in the above-identified patent and that said Letters Patent is hereby corrected as shown below:

Title Page [54] Title, Col. 1, line 3, after "FOR" insert --DURABLE,--.
Col. 1, line 44, after "the", delete "Pior" and insert --Prior--.

Signed and Sealed this

Tenth Day of April, 2001

Attest:

NICHOLAS P. GODICI

Attesting Officer     Acting Director of the United States Patent and Trademark Office